United States Patent Office 3,598,823
Patented Aug. 10, 1971

3,598,823
TRICYCLIC QUINAZOLINONES
Goetz E. Hardtmann, Florham Park, N.J., assignor to Sandoz-Wander, Inc., Hanover, N.J.
No Drawing. Filed May 28, 1969, Ser. No. 828,757
Int. Cl. C07d 57/12
U.S. Cl. 260—256.4         17 Claims

ABSTRACT OF THE DISCLOSURE

The compounds are biologically active tricyclic quinazolinones of the class of imidazo[2,1-b]quinazolin-5-ones, pyrimido[2,1-b]quinazolin - 6 - ones and diazepino [2,1-b]quinazolin - 7 - ones. Processes for preparation of said compounds include the reaction of a N-carboxy anthranilic anhydride (an isatoic anhydride), or an anthranilic acid with a cyclic pseudothiourea such as 2-organomercapto-4,5-dihydroimidazole or 2 - organomercapto-3,4,5,6-tetrahydropyrimidine.

---

The present invention relates to tricyclic compounds which are quinazolinones, and to their preparation. The invention also relates to methods and compositions for utilization of the compounds based on their biological activity.

The compounds of the invention may be represented for convenience of description by the structural Formulae I and II, as follows:

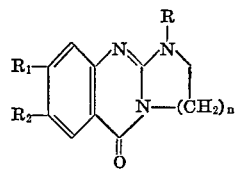

I

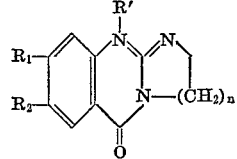

II wherein each of $R_1$ and $R_2$ is, independently, hydrogen or halo of atomic weight not greater than 36; or both are lower alkoxy of 1 to 2 carbon atoms;
$n$ is 1 to 3
R is hydrogen or lower alkyl of 1 to 5 carbon atoms;
R' is lower alkyl of 1 to 5 carbon atoms, phenyl or benzyl.

A preferred method for preparation of compounds of Formula I in which R is hydrogen involves reacting in a Step A a compound of the Formula III

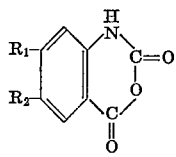

III wherein $R_1$ and $R_2$ are as defined, with a compound of Formula IV

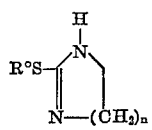

IV wherein $n$ is as defined and R° is lower alkyl or benzyl, whereby there is obtained a compound of Formula I-A

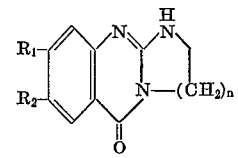

IA wherein $R_1$, $R_2$ and $n$ are as defined.

A preferred process for preparation of compounds I in which R is other than hydrogen involves in a Step B the reaction of a metallo salt of the Formula I-A'

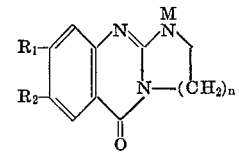

IA' wherein $R_1$, $R_2$ and $n$ are as defined and M is an alkali metal, with a compound of Formula V

$$XR_a \qquad V$$

wherein $R_1$, $R_2$ and $n$ are as defined, X is halo of atomic weight of 35 to 130, and $R_a$ is lower alkyl of 1 to 5 carbon atoms.

A preferred method of preparation of compounds II involves in a Step C the reaction of a compound III–A

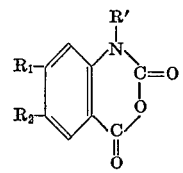

IIIA wherein R', $R_1$ and $R_2$ are as defined, with a compound IV above-identified.

An alternate procedure for preparation of compound I–A involves the reaction in a Step D of a compound of Formula VI

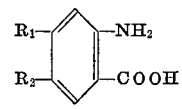

VI wherein $R_1$ and $R_2$ are as defined, with a compound IV (above-identified).

The preparation of compounds I in which R is hydrogen by the reaction of Step A may be carried out at elevated temperatures in the range of 60° C. to 140° C., preferably 80° C. to 120° C. The reaction is conveniently carried in an organic solvent of conventional type providing an inert reaction medium. Cyclic ethers suitable for use at reflux temperatures represent the preferred solvent, particularly dioxane. In general, the reaction product of Formula I may be recovered from the reaction of Step A by working up by conventional procedures.

The preparation of compounds I in which R is other than hydrogen is conveniently carried out at about room temperature (20° C.) although elevated temperatures of up to about 100° C. may be employed. The reaction of the metallo salt IA' with the appropriate halide V, preferably the iodide, is carried out in an inert organic solvent which may be conveniently the same solvent employed to prepare the metallo derivative of Formula I-A'. The preparation of the latter is carried out by treating a compound I-A with conventional agents commonly employed for preparing alkali metal salts, e.g. sodium hydride. The solvents for preparation of the metallo salt are of conventional type providing an inert reaction medium and the more suitable solvents include, for example, dimethylacetamide, dioxane and the like. The metallo salt of Formula I-A' is conveniently prepared at about room temperature. The reaction product of Formula I in which R is other than hydrogen may be recovered from the reaction of Step B by working up by conventional procedures.

The preparation of compounds II by Step C may be carried out under conditions similar to those for Step A as above described, and the reaction product of Formula II recovered by working up by conventional procedures.

The preparation of compound I-A by the reaction of Step D may be suitably carried out at elevated temperatures typically in the range of from 100° C. to 190° C., preferably 140° C. to 180° C. The reaction is conveniently carried out in an inert organic solvent of conventional type, preferably a high boiling organic solvent such as dimethylacetamide and dimethylformamide, more preferably dimethylacetamide. The reaction products of Formula I-A may be recovered from the reaction mixture of Step D by working up by established procedures.

The compounds of Formulae III, III-A, IV, V and VI employed in Steps A–D, inclusive, are either known or can be prepared from known procedures by established procedures.

Also within the scope of the novel compounds provided by the invention are pharmaceutically acceptable salts not materially depreciating the pharmacological effect of the compounds. Such salts include the acid addition salts of known type, e.g. the hydrochloride. The acid addition salts may be produced from the corresponding free bases by conventional procedures. Conversely, the free bases may be obtained from the salts by procedures known in the art.

The compounds of Formulae I and II of the invention are useful because they possess biological activity. In general, the compounds possess in animals one or more pharmacological activities of which anti-inflammatory activity, central nervous system activity, hypotensive activity and diuretic activity may be especially mentioned. In particular, the compounds of Formula I in which $n$ is 1 or 2 and $R_1$ and $R_2$ are from the group of hydrogen and halo and R is as defined are useful as anti-inflammatory agents as indicated by the Carrageenan-induced edema tests on the rat. For such use, the dosage will vary depending upon known factors such as the compound given and mode of administration. However, satisfactory results are generally obtained when administered at a daily dosage of from 2 to 200 milligrams per kilogram of body weight. For most mammals the administration of from 150 to 2000 milligrams per day provides satisfactory results and dosage forms suitable for internal administration comprise 35 to 1000 milligrams of the compound in admixture with a solid or liquid pharmaceutical carrier or diluent.

The compounds of Formula I in which $R_1$ and $R_2$ are lower alkoxy, $n$ is 1 or 2 and R is as defined; and all those in which $n$ is 3 and the compounds of Formula II are useful as hypotensive agents as indicated by a lowering of blood pressure on intravenous administration to the anesthetized dog. For such use and depending upon known variables satisfactory results are obtained in general on daily administration of from 5 to 100 milligrams per kilogram of body weight. For most mammals the administration of from 40 to 500 milligrams per day provides satisfactory results and dosage forms for internal administration comprise from 10 to 250 milligrams in combination with a suitable carrier.

In addition to the above activities it has been found that certain compounds of the invention as represented by the compounds of Examples 2, 4C, 5D and 6D are useful as tranquilizers and/or sedatives as indicated by exhibiting a mixed or depressant CNS response in behavior tests in mice and by exhibiting in animals one or more effects from the group of an antagonism to amphetamine in mice, an interaction with hexobarbital in mice, an inhibition of chemically and/or maximal electroshock induced convulsions in mice and a relaxation of muscle in mice in the rotarod test of Dunham et al. For such uses satisfactory results may be obtained in general at daily dosages of from 5 to 100 milligrams per kilogram of animal body weight with the daily dose for most mammals being in the range of about 350 to 1000 milligrams.

Certain compounds of the invention as represented by the compounds of Examples 3, 4B, 4D and 6C are also useful as Central Nervous System stimulants as indicated by behavior tests in mice. In addition, the compound of Example 4D exhibited a potentiation of amphetamine in mice. The compounds of Examples 3 and 6C also exhibited an ability to antagonize hexobarbital anesthesia in mice indicating the utility of such compounds as analeptics. For these uses the compounds may be administered at a daily dosage of from 1 to 100 milligrams per kilogram of animal body weight with daily dosage for most mammals being in the range of from 75 to 750 milligrams.

Also, the compounds represented by those of Examples 4D, 6A and 6B are useful as anti-depressants as indicated by a reversal of reserpine hypothermia in mice. For this use the compounds may be administered generally to animals at a daily dose of from 1 to 50 milligrams per kilogram of body weight with the daily dosage for most mammals being in the range of 75 to 750 milligrams.

The compounds of Examples 4B, 4C, 5D and 6A represent compounds useful as diuretics as indicated by tests in the unanesthetized rat on oral administration. Dosage for such use is between 4 to 100 milligrams per kilogram of animal body weight per day with the daily dosage for most mammals being in the range of 250 to 1000 milligrams.

In addition it was noted that the compounds of Examples 6A and 6B antagonize morphine in mice, and that the compound of Example 6A is useful as a bronchodilator as indicated by measuring bronchial resistance on intravenous administration in the guinea pig. For the latter use a daily dose is between 4 to 100 milligrams per kilogram of body weight with the dose for most mammals ranging between 300 to 1000 milligrams per day.

For all of the above usages, the compounds may be combined with a pharmaceutically acceptable carrier, and such other conventional adjuvants as may be necessary, and administered orally or parenterally. For most uses oral administration with carriers is preferred and may take place in such conventional forms as tablets, dispersible powders, granules, capsules, suspensions, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g. calcium carbonate, calcium phosphate and kaolin. The preferred pharmaceutical compositions from the standpoint of preparation and ease of oral administration are solid compositions particularly hard-filled capsules and tablets. Parenteral administration may be in such conventional forms as injectionable solutions and suspensions and may be preferred in certain situations as will be evident, for example, when desiring to employ certain compounds as analeptic agents.

A representative formulation is a tablet prepared by conventional tabletting techniques and containing the following ingredients:

| Ingredients: | Weight (mg.) |
|---|---|
| 9 - chloro-1,2,3,4-tetrahydropyrimido[2,1-b]quinazolin-6-one | 25 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

8-chloro-1,2,3,4-tetrahydropyrimido[2,1-b]quinazolin-6-one

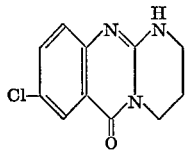

A mixture of 50 g. of 6-chloroisatoic anhydride and 25 g. of 2-methylmercapto - 3,4,5,6 - tetrahydropyrimidine in 400 ml. dioxane is refluxed in the presence of 1 pellet of sodium hydroxide for 18 hours. The resulting precipitate is removed by filtration, washed first with dioxane, then with diethyl ether and recrystallized from acetic acid to obtain 8-chloro-1,2,3,4-tetrahydropyrimido-[2,1-b]quinazolin-6-one, M.P. 267–269° C.

EXAMPLE 2

1-methyl-8-chloro-1,2,3,4-tetrahydropyrimido[2,1-b]quinazolin-6-one

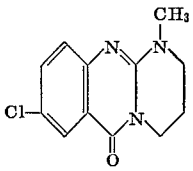

A solution of 10 g. of 8-chloro - 1,2,3,4 - tetrahydropyrimido[2,1-b]quinazolin - 6 - one in 250 ml. of dimethylacetamide at 40° is treated with 2.5 g. of sodium hydride (50% in mineral oil). The resulting yellow solution is stirred at room temperature for 30 minutes after which 4.5 ml. of methyl iodide is added and stirring at room temperature is continued for 3 hours. Most of the solvent is evaporated, water added, the crystalline precipitate removed by filtration and washed with water. The crude is recrystallized from methylene chloride/diethyl ether to obtain 1-methyl - 8 - chloro - 1,2,3,4-tetrahydropyrimido]2,1-b]quinazolin - 6 - one, M.P. 114–116° C.

EXAMPLE 3

11-methyl-8-chloro-2,3,4,11-tetrahydropyrimido[2,1-b]quinazolin-6-one

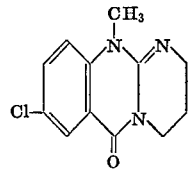

EXAMPLE 6

The following compounds of the invention are prepared employing the reaction of Step C which is exemplified in Example 3:
(A) 7-chloro-2,3-dihydro-10-methyl-imidazo[2,1-b]quinazolin-5(10H)-one, M.P. 200–202° C.
(B) 2,3-dihydro-10-phenyl-imidazo[2,1-b]quinazolin-5(10H)-one, M.P. 297–299° C.
(C) 9-chloro-12-methyl-2,3,4,5-tetrahydro-(11H)-diazepino[2,1-b]quinazolin-7-one, M.P. 118–119° C.
(D) 12-phenyl-2,3,4,5-tetrahydro-(11H)-diazepino[2,1-b]quinazolin-7-one, M.P. 181–183° C.

EXAMPLE 7

The following compounds of the invention are prepared employing the reaction of Step D:
(A) 8,9-dimethoxy-1,2,3,4-tetrahydropyrimido[2,1-b]quinazolin-6-one, M.P. 295–297° C.
(B) 9-chloro-1,2,3,4-tetrahydropyrimido[2,1-b]quinazolin-6-one, M.P. 288–290° C.

A mixture of 12.5 g. of 6-chloro-N-methylisatoic anhydried, 6.5 g. of 2-methylmercapto-3,4,5,6-tetrahydropyrimidine and one pellet of sodium hydroxide is refluxed in 200 ml. of dioxane for 18 hours. The cooled mixture is filtered through Celite and most of the solvent is evaporated. The residue is taken up in methylene chloride, the solution extracted with water, dried, treated with charcoal and evaporated to obtain an oily residue which is crystallized from diethyl ether to obtain 11-methyl-8-chloro-2,3,4,11-tetrahydropyrimido[2,1-b]quinazolin-6-one, M.P. 119–120° C. Additional amounts of this product could be obtained by working up the mother liquor by chromatography on silica gel and thereafter crystallizing from methylene chloride containing 5% methanol.

EXAMPLE 4

The following compounds of the invention are prepared employing the reaction of Step A which is exemplified in Example 1:
(A) 7-chloro-2,3-dihydro-1H-imidazo[2,1-b]quinazolin-5-one, M.P. 312–313° C.
(B) 2,3-dihydro-1H-imidazo[2,1-b]quinazolin-5-one, M.P. 264–265° C.
(C) 1,2,3,4-tetrahydropyrimido[2,1-b]quinazolin-6-one, M.P. 234–235° C.
(D) 2,3,4,5-tetrahydro-1H-diazepino[2,1-b]quinazolin-7-one, M.P. 145–148° C.

EXAMPLE 5

The following compounds of the invention are prepared employing the reaction of Step B which is exemplified in Example 2:
(A) 1-ethyl-1,2,3,4-tetrahydropyrimido[2,1-b]quinazolin-6-one, M.P. 100–102° C.
(B) 1-isopropyl-1,2,3,4-tetrahydropyrimido[2,1-b]-quinazolin-6-one, M.P. 100–101° C.
(C) 8-chloro-1-ethyl-1,2,3,4-tetrahydropyrimido[2,1-b]quinazolin-6-one, M.P. 96–97° C.
(D) 8,9-dimethoxy-1-methyl-1,2,3,4-tetrahydropyrimido[2,1-b]quinazolin-6-one, M.P. 210–211° C.
(E) 9-chloro-1-ethyl-1,2,3,4-tetrahydropyrimido[2,1-b]quinazolin-6-one, M.P. 129–131° C.

What is claimed is:
1. A compound of the formula:

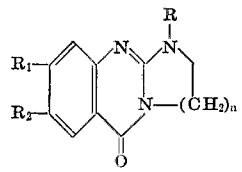

[I]

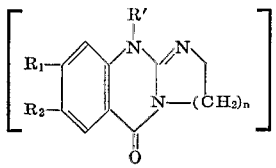

[II]

wherein
each of $R_1$ and $R_2$ is, independently, hydrogen or halo of atomic weight not greater than 36; or both $R_1$ and $R_2$ are a lower alkoxy of 1 to 2 carbon atoms;
$n$ is 1 to 3; and
R is hydrogen or lower alkyl of 1 to 5 carbon atoms; or a pharmaceutically acceptable acid addition salt thereof.

2. A compound of claim 1 in which $n$ is 1 or 2 and $R_1$ and $R_2$ are from the group of hydrogen and halo.
3. A compound of claim 2 in which at least one of $R_1$ and $R_2$ is halo.
4. A compound of claim 3 in which R is hydrogen.
5. A compound of claim 4 in which $n$ is 2.
6. A compound of claim 2 in which R is lower alkyl.
7. A compound of claim 6 in which $R_1$ and $R_2$ are hydrogen.
8. A compound of claim 7 in which $n$ is 2.
9. A compound of claim 6 in which one of $R_1$ and $R_2$ is halo.
10. A compound of claim 9 in which $n$ is 2.
11. A compound of claim 10 in which R is lower alkyl of 1 to 3 carbon atoms.
12. The compound of claim 5 which is 8-chloro-1,2,3,4-tetrahydropyrimido[2,1-b]quinazolin-6-one.
13. The compound of claim 11 which is 1-methyl-8-chloro - 1,2,3,4 - tetrahydropyrimido[2,1-b]quinazolin-6-one.
14. The compound of claim 5 which is 9-chloro-1,2,3,4-tetrahydropyrimido[2,1-b]quinazolin-6-one.
15. A compound of claim 1 having the Formula I in which $R_1$ and $R_2$ are 8,9-dialkoxy.
16. A compound of claim 15 in which R is lower alkyl.
17. A compound of claim 16 in which $n$ is 2.

References Cited
UNITED STATES PATENTS
3,257,401    6/1966    Wagner _____ 260—256.4

ALEX MAZEL, Primary Examiner

R. J. GALLAGHER, Assistant Examiner

U.S. Cl. X.R.
260—294, 518, 519; 424—251